United States Patent
Ketterle

(10) Patent No.: US 11,159,648 B2
(45) Date of Patent: Oct. 26, 2021

(54) SERVER-CLIENT ARCHITECTURE FOR AN INDUSTRIAL CONTROL NETWORK

(71) Applicant: CODESYS HOLDING GmbH, Kempten (DE)

(72) Inventor: Kevin Ketterle, Boerwang (DE)

(73) Assignee: CODESYS HOLDING GMBH, Kempten (DE)

(*) Notice: Subject to any disclaimer, the term of this patent is extended or adjusted under 35 U.S.C. 154(b) by 0 days.

(21) Appl. No.: 16/354,928

(22) Filed: Mar. 15, 2019

(65) Prior Publication Data
US 2019/0289100 A1 Sep. 19, 2019

(30) Foreign Application Priority Data
Mar. 19, 2018 (EP) .................................... 18162577

(51) Int. Cl.
| G06F 15/16 | (2006.01) |
| H04L 29/06 | (2006.01) |
| H04L 29/08 | (2006.01) |
| G05B 19/418 | (2006.01) |
| G05B 19/042 | (2006.01) |

(52) U.S. Cl.
CPC .......... *H04L 67/42* (2013.01); *G05B 19/0426* (2013.01); *G05B 19/418* (2013.01); *G05B 19/41845* (2013.01); *H04L 67/12* (2013.01); *G05B 19/4185* (2013.01); *G05B 2219/13144* (2013.01); *G05B 2219/23258* (2013.01); *G05B 2219/31229* (2013.01)

(58) Field of Classification Search
CPC ....... H04L 67/42; H04L 67/12; G05B 19/418; G05B 19/4185; G05B 2219/31229
USPC .................................. 709/202–203, 249–250
See application file for complete search history.

(56) References Cited

U.S. PATENT DOCUMENTS

| 8,086,670 | B1 * | 12/2011 | Zink | .................... | G05B 19/054 |
| | | | | | 709/203 |
| 8,261,235 | B2 * | 9/2012 | Chapman | ................. | G09B 7/02 |
| | | | | | 717/109 |
| 8,886,746 | B2 * | 11/2014 | Batke | ...................... | H04L 67/12 |
| | | | | | 709/223 |
| 9,086,696 | B2 * | 7/2015 | Plache | ............... | G05B 19/4185 |
| 9,766,611 | B2 * | 9/2017 | McKelvey | ......... | G05B 19/4185 |

(Continued)

OTHER PUBLICATIONS

Extended European Search Report dated Aug. 27, 2018 in priority application No. EP18162577.3 (6 pgs).

*Primary Examiner* — Bharat Barot
(74) *Attorney, Agent, or Firm* — Steven J. Grossman; Grossman, Tucker, Perreault & Pfleger PLLC

(57) ABSTRACT

A server device for an industrial control network comprises a first server interface adapted to communicate with a client device over a first network, a second server interface adapted to communicate with a plurality of industrial controller units over a second network, and a programming unit adapted to provide a programming environment for an industrial control program pertaining to at least a first industrial controller unit among the plurality of industrial controller units. The programming environment is accessible from the client device via the first server interface, and the programming unit is adapted to generate source code for the industrial control program in response to an instruction received from the client device via the first server interface.

12 Claims, 4 Drawing Sheets

(56) References Cited

U.S. PATENT DOCUMENTS

| | | | |
|---|---|---|---|
| 2003/0023336 A1* | 1/2003 | Kreidler | G05B 19/4183 |
| | | | 700/108 |
| 2010/0082814 A1* | 4/2010 | Plache | G05B 19/4185 |
| | | | 709/226 |
| 2012/0323994 A1* | 12/2012 | Stallard | H04L 67/42 |
| | | | 709/203 |
| 2015/0052253 A1* | 2/2015 | Johnson | H04L 61/3045 |
| | | | 709/226 |
| 2016/0266565 A1* | 9/2016 | McKelvey | G05B 19/054 |
| 2019/0182368 A1* | 6/2019 | Tang | H04L 69/22 |

* cited by examiner

SERVER-CLIENT ARCHITECTURE FOR AN INDUSTRIAL CONTROL NETWORK

FIELD OF THE INVENTION

The present invention relates to the field of industrial control, in particular to devices and methods for providing a programming environment for an industrial control system in a server-client architecture.

BACKGROUND OF THE INVENTION

Industrial control networks are ubiquitous in many areas of industry and manufacturing, and may comprise a plurality of industrial controller units, wherein each of the controller units stores a designated control software program and possibly control parameters adapted to control a machinery or group of machinery connected to the respective controller unit. The controller units may be integrated into the machinery, or may be stand-alone control devices.

Modern control networks oftentimes comprise a large number of industrial controller units (sometimes in the hundreds or even thousands), of which some may be identical, whereas others may also be of different types, generations, or versions. Hence, these control units may each require their own individual control programs, and may also comprise their own sets of control parameters. In general, there is a one-to-one relation between the industrial controller unit, and the corresponding industrial control program and/or set of parameters. In industrial control environments with a large number of industrial controller units, this poses challenges on the programming environment. A standard desk-top programming environment may be overwhelmed with the management of a large number of different control programs and parameter sets. Moreover, there may be a need to update industrial control programs and/or parameter sets for industrial controller units repeatedly throughout the lifetime of the industrial controller unit, either during routine maintenance operations or in case of a malfunction of an industrial controller unit. This requires detailed knowledge of the industrial control programs and/or corresponding parameter sets. In many instances, when an industrial control program needs to be updated or replaced, the same programming environment, or even the same version of the programming environment may be required to obtain identical compiled code. In addition, modern industrial control networks may be distributed geographically over different remote locations, which poses another layer of complexity for maintenance and trouble-shooting.

In view of these problems, there is a need for improvements in generating, distributing and maintaining industrial control programs for industrial control networks, in particular for large industrial control networks involving a significant number of industrial controller units, and possibly distributed over different geographic locations.

OVERVIEW

This objective is addressed with a server device for an industrial control network and a method for generating an industrial control program, and a client device for an industrial control network and a method for generating an industrial control program.

The dependent claims relate to preferred embodiments.

A server device for an industrial control network comprises a first server interface adapted to communicate with a client device over a first network; a second server interface adapted to communicate with a plurality of industrial controller units over a second network, and a programming unit adapted to provide a programming environment for an industrial control program pertaining to at least a first industrial controller unit among the plurality of industrial controller units. The programming environment is accessible from the client device via the first server interface, and the programming unit is adapted to generate source code for the industrial control program in response to an instruction received from the client device via the first server interface.

The techniques of the invention provide a programming environment for an industrial control network on a central server device. The programming environment may comprise, on the server device, all the functionality that is required to generate industrial control programs pertaining to the plurality of industrial controller units. In some examples, the programming unit may provide different types or versions of programming environments, depending on the requirements of the industrial control network. With the techniques according to the invention, the industrial control programs and/or parameter sets for the plurality of industrial controller units may be generated and managed on the central server device. The hardware requirements for the server device, such as in terms of processing or storage capacity, can be scaled up in proportion to the industrial control network that it serves.

The server device may manage and control a large plurality of industrial controller units, possibly distributed across different geographic locations, via the second network. This simplifies a central update and monitoring of the industrial controller network.

The server device, and in particular its programming environment may be accessible from the client device via the first server interface, wherein the client device can be a lean device that does not require large processing and/or memory capacity. This allows the central control and management of large control networks from a lean client device, such as from a PC desktop environment, a tablet or possibly even a cellphone, and in particular remotely via the first network.

A source code, in the sense of the present disclosure, may refer to computer code that is adapted and/or ready to be compiled by a compiler unit.

Sometimes such computer code is referred to as a language model or an intermediate language. Hence, generating a source code may comprise generating a language model or an intermediate language.

According to an example, the source code may be source code in a high-level programming language. In another example, the source code may comprise ladder-logic instructions.

According to an embodiment, the server device comprises a compiler unit, wherein the compiler unit is adapted to compile the source code to generate a compiled control program pertaining to the first industrial controller unit.

According to an embodiment, the programming environment may generate, upon instruction received from the client device, the source code for the industrial control program in a high-level programming language. The compiler unit may compile the source code to generate machine code, in particular to generate dedicated machine code pertaining to one or more industrial controller units among the plurality of industrial controller units.

Generating the source code, in the sense of the present disclosure, may refer to any step or process relating to the production of source code that is adapted and/or ready to be compiled by a compiler unit.

For instance, generating the source code may comprise generating source code from graphical elements of a project.

In some embodiments, generating the source code may comprise obtaining and/or combining elements of computer code, such as from a library unit and/or a database unit.

According to an example, the first server interface may be a hardware interface. In other examples, the first server interface may be a software interface. In some examples, the first server interface may be implemented partly in hardware and partly in software.

Similarly, the second server interface may be a software interface or a hardware interface, or may be implemented partly in software and partly in hardware.

An industrial controller unit, in the sense of the present disclosure, may refer to any device adapted to run an industrial control program, and in particular a compiled industrial control program, to control and/or monitor a machinery or an equipment coupled to the industrial control unit.

In an example, the server device further comprises a communication unit adapted to communicate with the plurality of industrial controller units via the second server interface.

In particular, the communication unit may be adapted to update at least the first industrial controller unit, in particular with the industrial control program.

In an example, the communication unit is adapted to send the compiled control program to the first industrial controller unit via the second server interface.

The communication unit may also be adapted to monitor the first industrial controller unit, in particular to receive and/or to send data pertaining to an operation of the first industrial controller unit via the second server interface.

In some examples, the communication unit may be adapted to communicate with the client device over the first server interface and the first network.

The server device may comprise a debugging unit adapted to monitor an operation of the server device and/or the plurality of industrial controller units and/or the industrial control program. The debugging unit may be adapted to detect and/or diagnose errors in an operation of the server device and/or the plurality of industrial controller units and/or the industrial control program.

The debugging unit may communicate results pertaining to its monitoring and/or analysis operation to the client device, such as via the first server interface and/or via the communication unit.

According to an embodiment, the server device further comprises a library unit adapted to hold library data pertaining to the first industrial controller unit, and in particular to provide the library data to the programming unit and/or the compiler unit.

The programming unit and/or compiler unit may employ the library data in generating the source code for the industrial control program.

In general, the programming unit may generate source code for any number of industrial control programs pertaining to different industrial controller units among the plurality of industrial controller units, possibly involving different programming environments or variants of programming environments. This is a particular advantage of the server device according to the invention.

Accordingly, the compiler unit may compile source code for the corresponding plurality of industrial controller units.

According to an embodiment, the programming unit, in response to the instruction received from the client device via the first server interface, is adapted to generate a first source code for the first industrial controller unit, and a second source code for a second industrial controller unit among the plurality of industrial controller units, the second source code being different from the first source code.

Moreover, the compiler unit may be adapted to compile the first source code to generate a first compiled control program pertaining to the first industrial controller unit, and may be further adapted to compile the second source code to generate a second compiled control program pertaining to the second industrial controller unit.

The communication unit may be adapted to distribute the plurality of compiled control programs to the respective plurality of industrial controller units via the second server interface and the second network.

The communication unit may be further adapted to monitor the plurality of industrial controller units, and to exchange data with each of the plurality of industrial controller units via the second server interface.

According to an embodiment, the server device further comprises a database unit adapted to store a plurality of industrial control programs and/or elements of industrial control programs, such as graphical elements, and/or a plurality of compiled industrial control programs, and/or a plurality of parameters, in particular a plurality of industrial control programs and/or a plurality of compiled industrial control programs and/or a plurality of parameters pertaining to the plurality of industrial controller units.

It is a particular advantage of the invention that it provides a central server device for storing and managing a potentially large number of industrial control programs and/or compiled industrial control programs and/or parameters for industrial control programs pertaining to a potentially large industrial control network.

According to an embodiment, the database unit is adapted to associate the plurality of industrial controller units with corresponding industrial control programs and/or compiled industrial control programs and/or parameters for the (compiled) industrial control programs.

The database unit may hence provide an archive of industrial control programs and/or parameters that assist a user in maintaining and updating the industrial controller units of the industrial control network, both upon initialization, or during routine maintenance or troubleshooting.

However, not all the industrial control programs and/or compiled industrial control programs and/or parameters stored in the database may be associated with a particular industrial controller unit. The database unit may also hold industrial control programs and/or compiled industrial control programs and/or parameters for testing purposes or for purposes or archiving and documenting.

According to an embodiment, the server device further comprises a file system for data management of the industrial control program and/or the compiled industrial control program and/or parameter sets pertaining to the plurality of industrial controller units.

According to an embodiment, the server device provides an industrial control program and/or a compiled industrial control program and/or a parameter for an industrial control program and/or a compiled industrial control program to the first industrial controller unit upon a request received by the first industrial controller unit.

For instance, the first industrial controller unit, upon initialization or at predetermined intervals, may send a request to the server device via the second network and the second server interface to request an update. The server device may update the first industrial controller unit, and possibly further industrial controller units among the plurality of industrial controller units, with an industrial control program and/or a compiled industrial control program and/or parameters in accordance with the association in the database.

In an embodiment, the server device further comprises a scheduler unit adapted to schedule an update of at least the first industrial controller unit with the industrial control program and/or a compiled industrial control program and/or a parameter for an industrial control program.

The server device may be adapted to send the industrial control program and/or the compiled industrial control program and/or the parameter to the respective industrial controller unit in accordance with the scheduled update.

For instance, the scheduler unit may schedule an update in accordance with a time condition, such as at a predetermined date or time or at regular intervals.

In some embodiments, the scheduler unit may schedule an update in accordance with a condition relating to a test of the industrial control program and/or the compiled industrial control program and/or the parameter.

In particular, the scheduler unit may be adapted to test the industrial control program and/or the compiled industrial control program and/or the parameter, and to trigger the update in response to the industrial control program and/or the compiled industrial control program and/or the parameter fulfilling a predetermined test condition.

The second network may be any communication network adapted to couple the server device to the plurality of industrial controller units, comprising wired and/or wireless networks. Communication via the second network may involve proprietary protocols as well as standardized protocols such as OPC UA, MQTT, or web-based protocols such as HTTP, web sockets, or other protocols.

The first network may be any data network that allows the server device to communicate with the client device, including wired and/or wireless networks. Communication via the first network may involve proprietary protocols as well as standard web-based protocols such as HTTP, web sockets, or the like.

In some embodiments, the second network is different from the first network. For instance, the second network may be a field bus network, whereas the first network may be the internet.

In other examples, the second network is identical to the first network.

The client device may be any device capable of providing instructions, such as programming instructions, to the server device.

In particular, the client device may be or may comprise a desktop personal computer, a laptop computer, a tablet device, or a mobile telephone device such as a smartphone.

In an example, the client device provides a user interface for communicating with the programming environment via the first server interface.

In some examples, the client device does not comprise a programming environment for generating the source code for the industrial control program.

This allows the client device to be a lean device with minimal processing and/or storage capacities. Still, via the access to the programming environment located at the central server device, the client device may nevertheless trigger and control programming and program code generation for a large industrial control network.

The disclosure further relates to a system comprising the server device with some or all of the features described above and the plurality of industrial controller units coupled to the server unit via the second network.

In a second aspect, the invention relates to a client device for an industrial control network, comprising a client interface adapted to communicate with a server device over a first network, wherein the server device provides a programming environment for an industrial control program. The client device is adapted to access the programming environment via the client interface and the first network, and to trigger the programming environment to generate source code for the industrial control program.

As described above, this allows a lean client device to generate source code and/or compiled code for a plurality of industrial controller units that may potentially require different versions of the programming environment. The client device, via the first network and the server device, may control, manage and/or monitor a large industrial control network.

The client interface, in the sense of the present disclosure, may be a hardware interface. In other examples, the client interface is a software interface. In some embodiments, the client interface may be implemented partly in hardware and partly in software.

According to an embodiment, the client device is adapted to trigger the programming environment to generate a first source code for a first industrial control program, and a second source code for a second industrial control program, the second source code being different from the first source code.

The client device may be adapted to trigger the server device to compile the source code to generate compiled source code.

According to an example, the client device may be adapted to trigger the server device to update an industrial controller unit coupled to the server device via a second network, in particular to update the industrial controller unit with the source code and/or a compiled source code and/or a parameter.

In an example, the client device is adapted to trigger the server device to store a plurality of industrial control programs and/or a plurality of compiled industrial control programs and/or a plurality of parameters, in particular a plurality of industrial control programs and/or a plurality of compiled industrial control programs and/or a plurality of parameters pertaining to a plurality of industrial controller units.

According to an example, the client device may be adapted to trigger the server device to associate a plurality of industrial controller units with corresponding industrial control programs and/or compiled industrial control programs and/or parameters.

The client device may be further adapted to trigger the server device to schedule an update of at least a first industrial controller unit with the industrial control program and/or a compiled industrial control program and/or a parameter.

According to an embodiment, the client device further comprises a user interface for the programming environment or server device.

The user interface may allow a user of the client device to access the programming environment of the server device for the programming of source code and/or the compiling of source code and/or the updating or monitoring of a plurality of industrial controller units associated with and/or coupled to the server device.

In some examples, the client device may provide a faceless application for the programming environment or server device.

According to an embodiment, the client device does not comprise a full programming environment for the industrial control program. These functionalities may be relegated to the server device, which allows the client device to be a particularly lean device.

In an example, the client device may be adapted to receive, from the server device, data pertaining to a debugging and/or monitoring and/or analyzing of the industrial control program.

The invention further relates to a system comprising a server device with some or all of the features described above, and a client device with some or all of the features described above.

The system may further comprise the plurality of industrial controller units coupled to the server unit via the second network.

In a further aspect, the invention relates to a method for generating an industrial control program, comprising the steps of providing, on a server device, a programming environment for an industrial control program pertaining to at least a first industrial controller unit among a plurality of industrial controller units; receiving an instruction from a client device, the client device being coupled to the server device over a first network; and generating source code for the industrial control program on the server device in response to the instruction.

According to an embodiment, the method further comprises compiling the generated source code on the server device.

In an embodiment, the method comprises generating a first source code pertaining to the first industrial controller unit, and a second source code pertaining to a second industrial controller unit among the plurality of industrial controller units, the second source code being different from the first source code.

According to an example, the method further comprises storing a plurality of industrial control programs and/or a plurality of compiled industrial control programs and/or a plurality of parameters, in particular a plurality of industrial control programs and/or a plurality of compiled industrial control programs and/or a plurality of parameters pertaining to the plurality of industrial controller units.

In an embodiment, the method further comprises associating the plurality of industrial controller units with corresponding industrial control programs and/or compiled industrial control programs and/or parameters.

The method further comprises, in an embodiment, a step of receiving, from the first industrial controller unit, a request for the industrial control program and/or a compiled industrial control program and/or a parameter for the industrial control program or the compiled industrial control program.

The method may further comprise a step of providing the industrial control program and/or the compiled industrial control program and/or the parameter to the first industrial controller unit in response to the request, in particular in accordance with an association of the first industrial controller unit with corresponding industrial control programs and/or compiled industrial control programs and/or parameters.

According to an embodiment, the method further comprises scheduling an update of at least the first industrial controller unit with the industrial control program and/or a compiled industrial control program and/or a parameter.

According to an embodiment, the method further comprises debugging the industrial control program.

Debugging the industrial control program may comprise monitoring and/or analyzing an operation of the industrial control program.

According to an embodiment, the method further comprises reporting data pertaining to the monitoring and/or analyzing to the client device.

The method described above teaches the invention from the server perspective. However, the invention may likewise be described from the complementary client perspective.

Hence, in a further aspect, the invention relates to a method for generating an industrial control program, comprising the steps of accessing, by means of a client device, a programming environment for an industrial control program on a server device connected to the client device via a first network; and triggering the programming environment to generate source code for the industrial control program.

According to an example, the accessing may be by means of a user interface.

In an example, the method further comprises triggering the programming environment to generate a first source code for a first industrial control program, and a second source code for a second industrial control program, the second source code being different from the first source code.

The method may further comprise triggering the server device to compile the source code to generate compiled source code.

The method may further comprise triggering the server device to update an industrial controller unit coupled to the server device via a second network, in particular to update the industrial controller unit with the source code and/or a compiled source code and/or a parameter.

In an embodiment, the method further comprises triggering the server device to store a plurality of industrial control programs and/or a plurality of compiled industrial control programs and/or a plurality of parameters, in particular a plurality of industrial control programs and/or a plurality of compiled industrial control programs and/or a plurality of parameters pertaining to a plurality of industrial controller units.

According to an embodiment, the method may further comprise triggering the server device to associate a plurality of industrial controller units with corresponding industrial control programs and/or compiled industrial control programs and/or parameters.

According to an example, the method further comprises triggering the server device to schedule an update of at least a first industrial controller unit with the industrial control program and/or a compiled industrial control program and/or a parameter.

In an example, the method further comprises triggering the server device to conduct a test of the industrial control program and/or the compiled industrial control program and/or the parameter before the update.

In the embodiments described above, triggering may involve providing an instruction from the client device to the server device via the first network.

According to an embodiment, the method may comprise receiving, from the server device, data pertaining to a debugging and/or monitoring and/or analyzing of the industrial control program.

The invention further relates to a computer program or to a computer program product comprising computer-readable instructions adapted to implement, on a computer system, a method with some or all of the features described above.

BRIEF DESCRIPTION OF THE DRAWINGS

The numerous features and advantages of the present invention will be best apparent from a detailed description of exemplary embodiments with reference to the accompanying drawings, in which.

DETAILED DESCRIPTION

Figure 1:
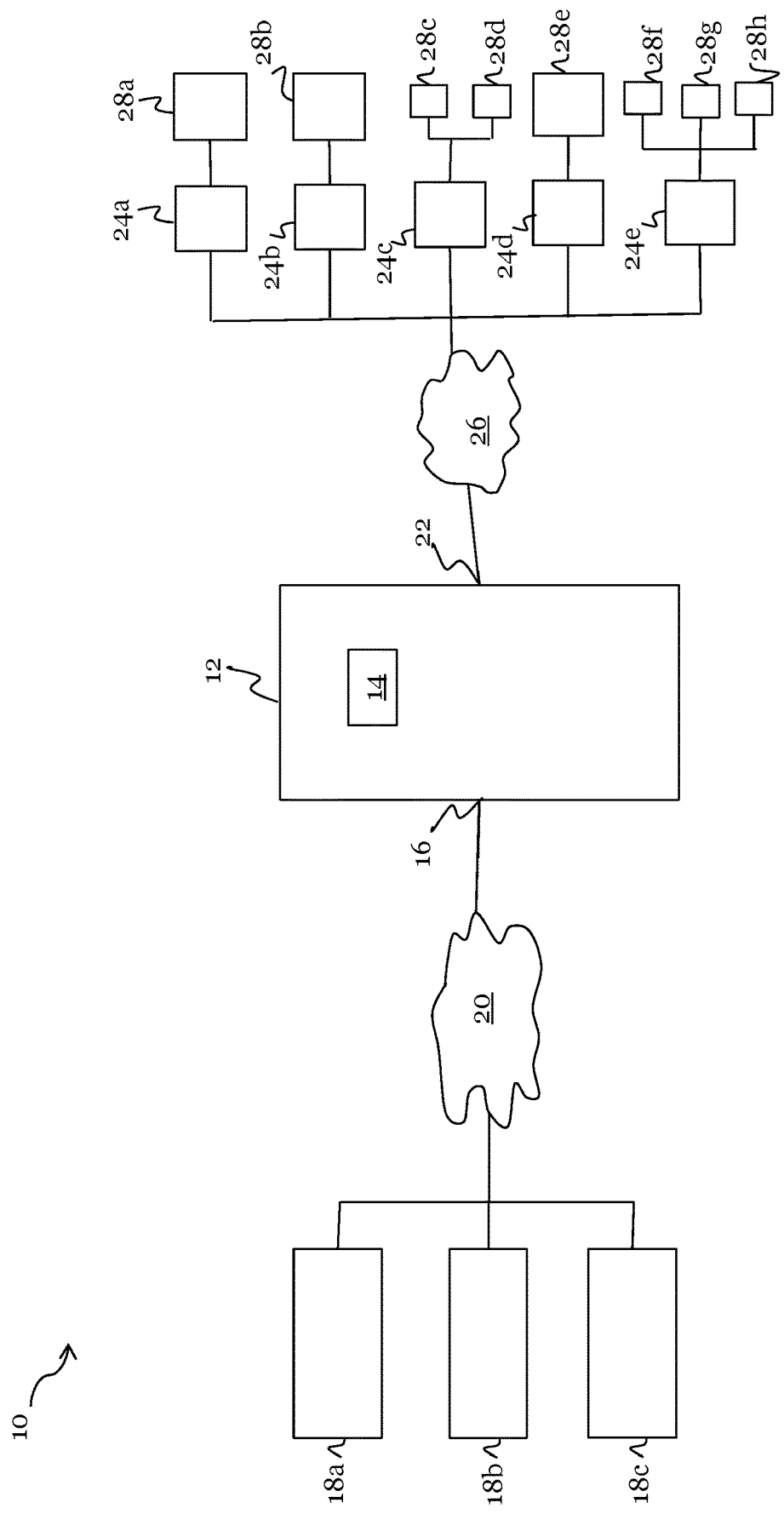
FIG. 1 is a schematic overview of a server-client architecture for an industrial control network in which the present invention may be employed.

FIG. 1 is a schematic illustration of an industrial control system m in which the present invention can be employed. In some examples, the industrial control system 10 may be a system for controlling machines or factory equipment in a manufacturing environment, or may be employed to control equipment for a chemical or pharmaceutical production process. In other examples, the industrial control system m may be employed to control a lighting system and/or a ventilation system and/or heating system in a building, or across a plurality of buildings.

The industrial control system m illustrated in FIG. 1 comprises a server device 12 with a programming unit 14 that provides a programming environment for the industrial control system 10.

The server device 12 further comprises a first server interface 16 that is adapted to communicate with at least one client device 18a, 18b, 18c over a first network 20. For instance, the first network 20 may be a wired or wireless network, or may comprise a combination of wired and wireless networks. In some examples, the first network 20 is the internet. Communication between the server device 12 and the client devices 18a, 18b, 18c may be via a proprietary communication protocol, or via a web-based standardized protocol such as HTTP or web sockets.

As can be further taken from FIG. 1, the server device 12 additionally comprises a second server interface 22 adapted to communicate with a plurality of industrial controller units 24a to 24e via a second network 26.

The second network 26 may be a wired or wireless network, or a combination of a wired network and a wireless network. Communication between the server device 12 and the industrial controller units 24a to 24e via the second network 26 may employ a proprietary communication protocol, or a standardized industrial control protocol such as OPC UA, or MQTT, as well as a standardized web-based protocol such as HTTP or web sockets.

FIG. 1 shows a configuration with five industrial controller units 24a to 24e. However, this is for illustration only, and in applications the industrial control system 10 may comprise any number of industrial controller units, possibly distributed over a plurality of manufacturing sites or geographical locations.

Each of the industrial controller units 24a to 24e may be adapted to run an industrial control program, such as a compiled industrial control program or ladder logic provided by the server device 12 via the second network 26. The industrial controller units 24a to 24e are each coupled to one or more industrial control processes or machinery 28a to 28h that they control by means of the respective industrial control program. For instance, the control may involve exchange of instructions and data between the industrial controller units 24a to 24e and the associated industrial control processes 28a to 28h. For instance, the industrial control processes, 28a to 28h may be lighting applications and/or heating/ventilation applications in an office building.

In the industrial control system 10 of FIG. 1, the server device 12 may, by means of the programming unit 14, provide a complete programming environment that is adapted to generate source code for each of the industrial controller units 24a to 24e, and may provide the source code and/or parameters to the respective industrial controller units 24a to 24e via the second server interface 22 and the second network 26, upon an instruction received from one of the client devices 18a, 18b, 18c via the first network 20 and the first server interface 16.

In some examples, some or all of the industrial controller units 24a to 24e may control different industrial control processes or machinery 28a to 28h, and hence may require different industrial control programs, or different parameters. Moreover, some or all of the industrial controller units 24a to 24e may be of different type, model, or generation, and hence may also require different industrial control programs for that reason. In some instances, the programming environments required to generate industrial control programs for the industrial controller units 24a to 24e may differ as well.

In the industrial control system 10, the entire programming infrastructure, comprising possibly different programming environments for different industrial controller units 24a to 24e may be provided on the central server device 12. This may include some of or most of the logic of a typical programming environment, involving source code data management, compiling, code generation, as well as communication functionalities for transferring the industrial control programs to the respective industrial controller units 24a to 24e, as well as monitoring and debugging the industrial control program running on each of the industrial controller units 24a to 24e. Programming infrastructures such as libraries and device descriptions may also be provided as part of the programming environment on the server device 12.

Advantageously, the processing resources and/or memory resources of the server device 12 may be updated dynamically in accordance with the varying size of the industrial control network, in particular in accordance with the number and types of the industrial controller units 24a to 24e as well as the number and type of the industrial control processes and machinery 28a to 28h.

The user may access the programming environment on the server device 12 by means of one of the client devices 18a, 18b, 18c via the first network 20 and the first server interface 16. Advantageously, given that all or almost all of the programming logic is allocated on the server device 12, none of the client devices 18a, 18b, 18c requires a full programming environment, let alone different versions of the programming environment or different programming environments for different industrial controller units 24a to 24e. As a consequence, none of the client devices 18a, 18b, 18c need to comprise more than a user interface required for accessing the programming unit 14 of the server device 12, although in some embodiments some or all of the client devices 18a, 18b, 18c may optionally comprise additional functionalities of a programming environment themselves. In any case, the client devices 18a, 18b, 18c can be lean devices that do not require excessive processing or memory resources.

As an example, the client device 18a may be a lean device with a web browser adapted to provide a user interface for accessing the programming unit 14 via the second network 26. The client device 18a may be a mobile device that requires only minimal processing and memory capabilities, such as a cellphone.

The client device 18b may be a tablet device with a specific programming app adapted to access the programming unit 14 via the second network 26 by means of a proprietary communication protocol.

The client device 18c may be a conventional desktop programming environment or a user personal computer. In this case, the client device 18c may not only trigger the server device 12 to generate source code for a particular industrial control program, but may likewise generate industrial control programs for one or more of the plurality of industrial controller units 24a to 24e itself, and may provide industrial control programs to the respective industrial controller units 24a to 24e. However, also in this case it is an advantage that the client device 18c may not need to provide different programming environments for different industrial controller units 24a to 24e.

Advantageously, the server-client architecture according to the invention allows to separate a user interface of the programming interface from its underlying logic functionality, in particular from the generation of source code, the compiling of source code into machine code, and the project management functionalities. The latter functionalities may be located on the server device 12 with scalable processing and memory resources. The user interfaces located on the client devices 18a, 18b, 18c neither require high processing capacity nor large memory, which allows the use of conventional tablets or even smartphones for managing even large industrial control systems 10 with a high number of industrial controller units or associated machinery.

Figure 2:
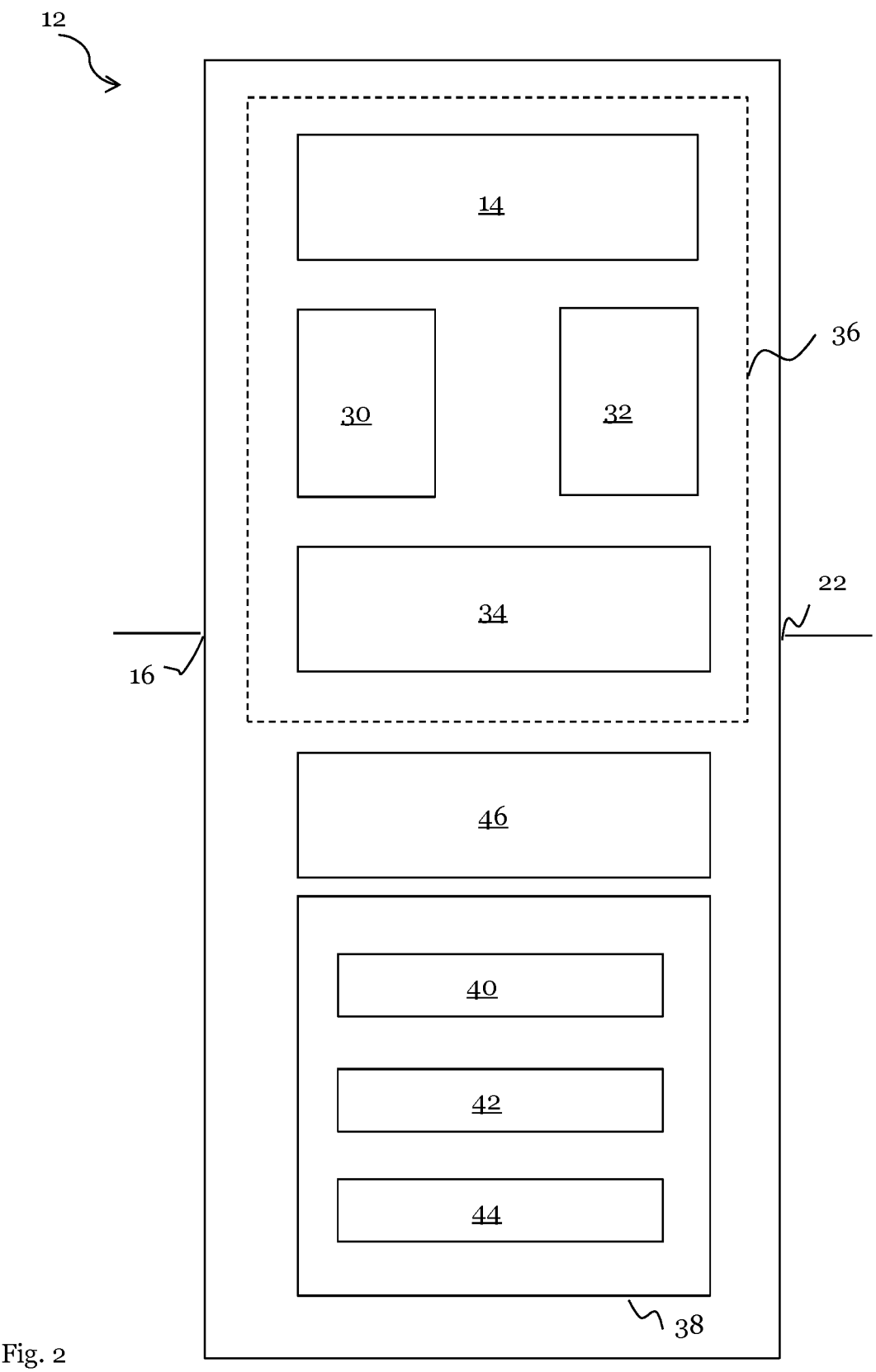
FIG. 2 is a schematic illustration of a server device according to an embodiment.

An embodiment of a server device 12 is shown in additional detail in the schematic drawing of FIG. 2.

The server device 12 comprises the programming unit 14 adapted to generate source code for an industrial control program in response to an instruction received from one of the client devices 18a, 18b, 18c via the first server interface 16.

The server device 12 further comprises a compiler unit 30, which may be coupled to the programming unit 14 to receive from the programming unit 14 the generated source code. The compiler unit 30 compiles the source code into machine code for an industrial control program, such as in response to an instruction received from one of the client devices 18a, 18b, 18c via the first server interface 16.

As can be further taken from FIG. 2, the server device 12 additionally comprises a library unit 32, which may be adapted to hold library data pertaining to the industrial controller units 24a to 24e, and/or to provide the library data to the programming unit 14 and/or the compiler unit 30 for the generation of the industrial control program.

The server device 12 additionally comprises a communication unit 34 that is coupled to the programming unit 14, compiler unit 30, and library unit 32. The communication unit 34 is connected to the first server interface 16, and is adapted to exchange data with the client devices 18a, 18b, 18c via the first network 20. In particular, the communication unit 34 receives instructions from the client devices 18a, 18b, 18c, and triggers the programming unit 14 to generate source code for the industrial controller units 24a to 24e in response to the received instructions. The communication unit 34 further provides information and data from the programming unit 14 to the client devices 18a, 18b, 18c via the first server interface 16 and first network 20. In some examples, such information and data may pertain to a debugging of the server device 12 and/or a monitoring and/or analyzing of an operation of the server device 12, or the industrial controller units 24a to 24e.

The communication unit 34 is further coupled to the second server interface 22, and may be adapted to manage and control the communication between the server device 12 and the plurality of industrial controller units 24a to 24e via the second network 26. In particular, the communication unit 34 may be adapted to transfer the source code generated by the programming unit 14 and/or the compiled machine code generated by the compiler unit 30 to the respective industrial controller units 24a to 24e.

Hence, in the configuration of FIG. 2, the programming unit 14, the compiler unit 30, the library unit 32, and the communication unit 34 in combination establish the functionalities of a programming environment 36 for an industrial control program. The only component missing may be the user interface, which, in the server-client architecture of the embodiment, is relegated to the client devices 18a, 18b, 18c.

In particular, the programming environment 36 may be adapted to generate different source code and different compiled source code for different industrial controller units 24a to 24e.

As can be further taken from FIG. 2, the server device 12 additionally comprises a database unit 38, which may be adapted to store a plurality of industrial control programs and/or a plurality of compiled industrial control programs and/or a plurality of parameters, in particular a plurality of industrial control programs and/or a plurality of compiled industrial control programs and/or a plurality of parameters pertaining to the plurality of industrial controller units 24a to 24e.

By way of example, the database unit 38 may comprise a program database 40 adapted to store a plurality of industrial control programs, either as source code and/or as compiled machine code. Some of these industrial control programs may be active on one of the industrial controller units 24a to 24e. However, other programs may be stored in the program database 40 for test or archiving purposes.

The database unit 38 additionally comprises a parameter database 42, which may be adapted to store program-specific parameters or sets of parameters. Similarly to the program database 40, some of the parameters or parameter sets may pertain to specific industrial controller units 24a to 24e, while others may be stored for testing or archiving purposes.

The database unit 38 further comprises an association table 44, which associates specific programs from the program database 40 and/or parameters from the parameter database 42 to particular industrial controller units 24a to 24e. In other words, the association table describes exactly and completely which industrial control program or compiled industrial control program and/or which set of parameters belong to each individual industrial controller unit 24a to 24e. The association table 44 of the database unit 38 hence facilitate the central administration of industrial control programs and/or parameter sets, and greatly facilitates the update and maintenance of the industrial controller units 24a to 24e, even after years of service.

The techniques according to the present invention likewise assist in reducing the inconvenience and risk of inappropriate hardware and software versions for the industrial control environment. In particular, each of the client devices 13a, 13b, 13c may automatically work with the particular programming tools or programming environment 36 which has been approved or designated for the respective industrial controller units 24a to 24e of the industrial control system 10.

As can be taken from FIG. 2, the server device 12 may additionally comprise a scheduler unit 46. The scheduler unit 46 may have different functionalities. On the one hand, the scheduler unit 46 may be adapted to schedule an update of the industrial controller units 24a to 24e with industrial control programs and/or parameters that are generated by the compiler unit 30, or provided from the database unit 38. For instance, the scheduler unit 46 may be adapted to initiate an update of a large number of industrial controller units 24a to 24e during nighttime or during a holiday season, so to minimize interference with the operation of the industrial control process/machinery 28a to 28h.

In addition, the scheduler unit 46 may also be adapted to test industrial control programs generated by the programming environment 36, or stored in the database unit 38, and update the industrial controller units 24a to 24e only if the tests have been concluded successfully. The scheduler unit 46 hence provides a continuous integration component.

The central storage of industrial control programs in the database unit 38 and the central testing and update by means in the scheduler unit 46 greatly assist in the maintenance and administration of an industrial control system 10 comprising a large number of industrial controller units 24a to 24e, and significantly reduce the risk of errors or malfunctions in the update process.

In case a new industrial controller unit 24a to 24e is added to the industrial control system 10, or an industrial controller unit is replaced, the server device 12 may automatically detect the new industrial controller unit 24a to 24e in a network scan, and may automatically provide the appropriate industrial control program and/or parameters stored in the program database 40 and the parameter database 42, respectively, via the second server interface 22 and the second network 26. In particular, the specific industrial control program and/or parameters may be provided in accordance with an association stored in the association table 44 for that particular model or type of industrial controller unit. This reduces the risk that a replaced or added industrial controller unit is erroneously provided with the wrong industrial control program and/or the wrong sets of parameters, and hence minimizes the system downtime.

In some instances, the server device 12 may not be capable of deciding on the required industrial control program and/or parameters fully automatically, for instance when several industrial controller units 24a to 24e are replaced simultaneously, or if the industrial controller units 24a to 24e are not adapted to automatically identify themselves to the server device 12. However, in these situations it may be sufficient for the user to dedicate the new industrial controller unit 24a to 24e, or provide some update information to the server device 12 that allows the server device 12 to select the appropriate industrial control program and/or parameters from the database unit 38, or generate them by means of the programming environment 36. The update may then proceed as described above, again minimizing the risk of human failure and reducing the downtime.

Figure 3:
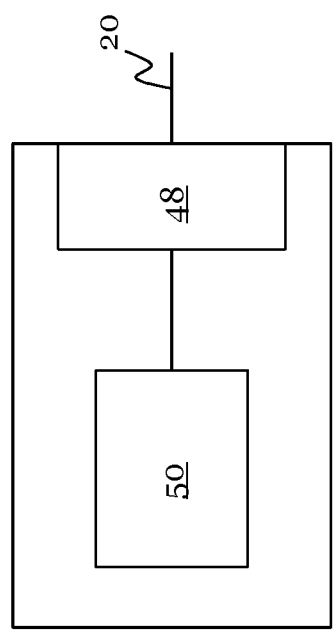
FIG. 3 is a schematic illustration of a client device according to an embodiment.

FIG. 3 is a schematic illustration of a client device 18, such as one of the client devices 18a, 18b, 18c described above with reference to FIG. 1.

The client device 18 comprises a client interface 48, which may be adapted to communicate with the server device 12 via the first network 20.

The client device 18 additionally comprises a user interface 50 which may allow a user to access the programming environment 36 via the client interface 48 and the first network 20. The user interface 50 may serve as an external user interface for the programming environment 36.

As described above with reference to FIGS. 1 and 2, given that the programming environment 36 is centrally located at the server device 12, the client device 18 does not necessarily need to comprise a full programming environment on its own, and may still be adapted to manage the generation and deployment of industrial control programs and/or parameters to a large number of industrial controller units 24a to 24e by means of instructions provided to the server device 12.

The client device 18 may also be adapted to receive feedback and/or data from the programming environment 36, or from the industrial controller units 24a to 24e via the server device 12, such as for means of maintenance and monitoring.

Figure 4:
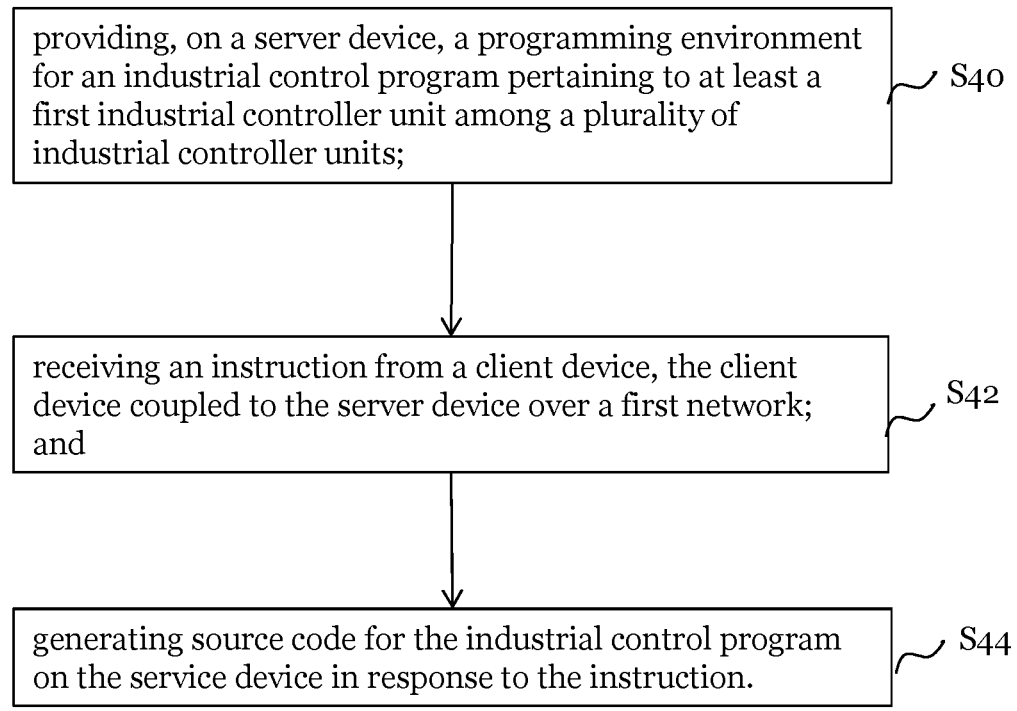
FIG. 4 shows a flow diagram of a method for generating an industrial control program from server perspective according to an embodiment.

FIG. 4 is a flow diagram of a method for generating an industrial control program from a server perspective.

In a first step S40, a programming environment for an industrial control program pertaining to at least a first industrial controller unit among a plurality of industrial controller units is provided on a server device.

In a second step S42, an instruction is received from a client device, the client device being coupled to the server device over a first network.

In a third step S44, source code for the industrial control program is generated on the server device in response to the received instruction.

Figure 5:
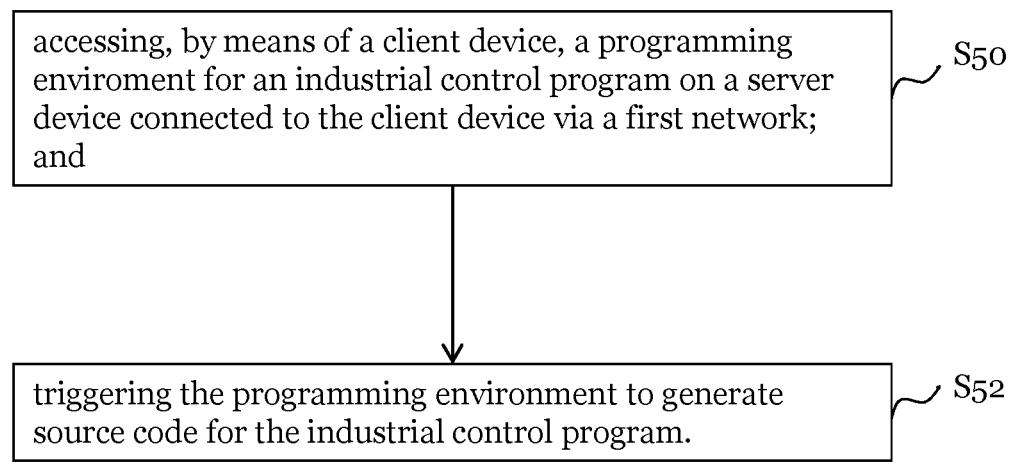
FIG. 5 shows a flow diagram of a method for generating an industrial control program from a client perspective according to another embodiment.

FIG. 5 is another flow diagram that illustrates a method for generating an industrial control program, but from the complementary perspective of a client device.

In a first step S50, a programming environment for an industrial control program is accessed by means of a client device, wherein the programming environment is located on a server device connected to the client device via a first network.

In a second step S52, the programming environment is triggered to generate source code for the industrial control program.

The numerous examples and the Figures merely serve to illustrate the invention, but should not be interpreted to comprise a limitation. The scope of the invention is defined by the appended claims.

REFERENCE SIGNS 10 industrial control system
12 server device
14 programming unit
16 first server interface
18 client device
18a, 18b, 18c client devices
20 first network
22 second server interface
24a-24e industrial controller units
26 second network
28a-28h industrial control process/machinery
30 compiler unit 32 library unit
34 communication unit
36 programming environment
38 database unit
40 program database
42 parameter database
44 association table
46 scheduler unit
48 client interface
50 user interface

The invention claimed is:

1. A server device for an industrial control network, comprising:
 a first server interface adapted to communicate with a client device over a first network;
 a second server interface adapted to communicate with a plurality of industrial controller units over a second network; and
 a programming unit adapted to provide a programming environment for an industrial control program pertaining to at least a first industrial controller unit among the plurality of industrial controller units;
 wherein the programming environment is accessible from the client via the first server interface;
 wherein the programming unit is adapted to generate source code for the industrial control program in response to an instruction received from the client device via the first server interface; and
 wherein the server device further comprises a compiler unit, wherein the compiler unit is adapted to compile the source code to generate a compiled industrial control program, the compiled industrial control program being machine code pertaining to the first industrial controller unit and configured to be an active industrial control program on the first industrial controller unit.

2. The server device according to claim 1, wherein the programming unit, in response to the instruction received from the client device via the first server interface, is adapted to generate a first source code for the first industrial controller unit, and a second source code for a second industrial controller unit among the plurality of industrial controller units, the second source code being different from the first source code.

3. The server device according to claim 1, further comprising a database unit adapted to store a plurality of industrial control programs and/or a plurality of compiled industrial control programs and/or a plurality of parameters, in particular a plurality of industrial control programs and/or a plurality of compiled industrial control programs and/or a plurality of parameters pertaining to the plurality of industrial controller units.

4. The server device according to claim 3, wherein the database unit is adapted to associate the plurality of industrial controller units with corresponding industrial control programs and/or compiled industrial control programs and/or parameters.

5. The server device according to claim 1, further comprising a scheduler unit adapted to schedule an update of at least the first industrial controller unit with the industrial control program and/or a compiled industrial control program and/or a parameter.

6. A client device for an industrial control network, comprising:
 a client interface adapted to communicate with a server device over a first network, wherein the server device provides a programming environment for an industrial control program; and
 wherein the client device is adapted to access the programming environment via the client interface and the first network, and to trigger the programming environment to generate source code for the industrial control program, and to trigger the programming environment to compile the source code to generate a compiled industrial control program, the compiled industrial control program being machine code pertaining to an industrial controller unit and configured to be an active industrial control program on the industrial controller unit.

7. The client device according to claim 6, further comprising a user interface for the programming environment.

8. A method for generating an industrial control program, comprising:
 providing, on a server device, a programming environment for an industrial control program pertaining to at least a first industrial controller unit among a plurality of industrial controller units;
 receiving an instruction from a client device, the client device being coupled to the server device over a first network;
 generating source code for the industrial control program on the server device in response to the instruction; and
 compiling the generated source code on the server device to generate a compiled industrial control program, the compiled industrial control program being machine code pertaining to the first industrial controller unit and configured to be an active industrial control program on the first industrial controller unit.

9. The method according to claim 8, further comprising:
 generating a first source code pertaining to the first industrial controller unit, and a second source code pertaining to a second industrial controller unit among the plurality of industrial controller units, the second source code being different from the first source code.

10. The method according to claim 8, further comprising storing a plurality of industrial control programs and/or a plurality of compiled industrial control programs and/or a plurality of parameters, in particular a plurality of industrial control programs and/or a plurality of compiled industrial control programs and/or a plurality of parameters pertaining to the plurality of industrial controller units.

11. The method according to claim 8, further comprising scheduling an update of at least the first industrial controller unit with the industrial control program and/or a compiled industrial control program and/or a parameter.

12. A method for generating an industrial control program, comprising:
 accessing, by a client device, a programming environment for an industrial control program on a server device connected to the client device via a first network; and
 triggering the programming environment to generate source code for the industrial control program and to compile the source code to generate a compiled industrial control program, the compiled industrial control program being machine code pertaining to an industrial controller unit and configured to be an active industrial control program on the industrial controller unit.

* * * * *